United States Patent
Kwon (10) Patent No.: US 11,691,536 B2
(45) Date of Patent: Jul. 4, 2023

(54) POWER SYSTEM FOR A VEHICLE

(71) Applicants: HYUNDAI MOTOR COMPANY, Seoul (KR); KIA CORPORATION, Seoul (KR)

(72) Inventor: Jae Min Kwon, Incheon (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 17/540,103

(22) Filed: Dec. 1, 2021

(65) Prior Publication Data
US 2022/0355705 A1    Nov. 10, 2022

(30) Foreign Application Priority Data
May 10, 2021    (KR) .................. 10-2021-0059701

(51) Int. Cl.
| | | |
|---|---|---|
| B60L 58/22 | (2019.01) | |
| B60L 50/60 | (2019.01) | |
| H02J 7/00 | (2006.01) | |
| B60R 16/033 | (2006.01) | |
| H02M 1/00 | (2006.01) | |
| H02J 7/34 | (2006.01) | |
| B60L 58/19 | (2019.01) | |
| H02M 3/00 | (2006.01) | |

(52) U.S. Cl.
CPC .......... *B60L 58/22* (2019.02); *B60L 50/60* (2019.02); *H02J 7/0013* (2013.01); *H02J 7/00712* (2020.01); *B60L 2210/10* (2013.01); *B60L 2240/12* (2013.01); *B60L 2240/547* (2013.01); *B60R 16/033* (2013.01); *H02J 2207/20* (2020.01)

(58) Field of Classification Search
None
See application file for complete search history.

(56) References Cited

U.S. PATENT DOCUMENTS

2013/0002016 A1*  1/2013  Furukawa .......... H01M 10/425
                                                          307/43
2020/0339103 A1* 10/2020  Takahashi ................ B60L 3/04

FOREIGN PATENT DOCUMENTS

KR           102178378 B1    11/2020

* cited by examiner

*Primary Examiner* — Jared Fureman
*Assistant Examiner* — Aqeel H Bukhari
(74) *Attorney, Agent, or Firm* — Lempia Summerfield Katz LLC (57) ABSTRACT

A power system for a vehicle includes: a high voltage battery; a low voltage DC-DC converter configured to step down a voltage of the high voltage battery and to output the stepped down voltage; a low voltage battery charged by an output current of the low voltage DC-DC converter, where the low voltage battery includes a first cell group including a plurality of battery cells, and a second cell group connected in parallel with the first cell group and including a plurality of battery cells; and a plurality of switches configured to electrically connect or disconnect the first cell group or the second cell group with the low voltage DC-DC converter, electrical loads configured to receive power from at least one of the low voltage DC-DC converter and the low voltage battery; and a controller configured to control opening or closing of the plurality of switches.

14 Claims, 9 Drawing Sheets

POWER SYSTEM FOR A VEHICLE

CROSS-REFERENCE TO RELATED APPLICATION

The present application claims the benefit of and the priority to Korean Patent Application No. 10-2021-0059701 filed on May 10, 2021, the entire contents of which are incorporated herein by reference.

BACKGROUND

Technical Field

The present disclosure relates to a power system for a vehicle. More particularly, it relates to a power system for a vehicle which allows power network separation and connection.

Description of Related Art

In an eco-friendly vehicle, such as an electric vehicle to which a high voltage battery is applied, a voltage of the high voltage battery is stepped down through a low voltage power converter so as to supply electrical power to various electrical loads in the vehicle. The voltage stepped down through the low voltage power converter is provided to a low voltage battery as charging voltage.

Figure 1:
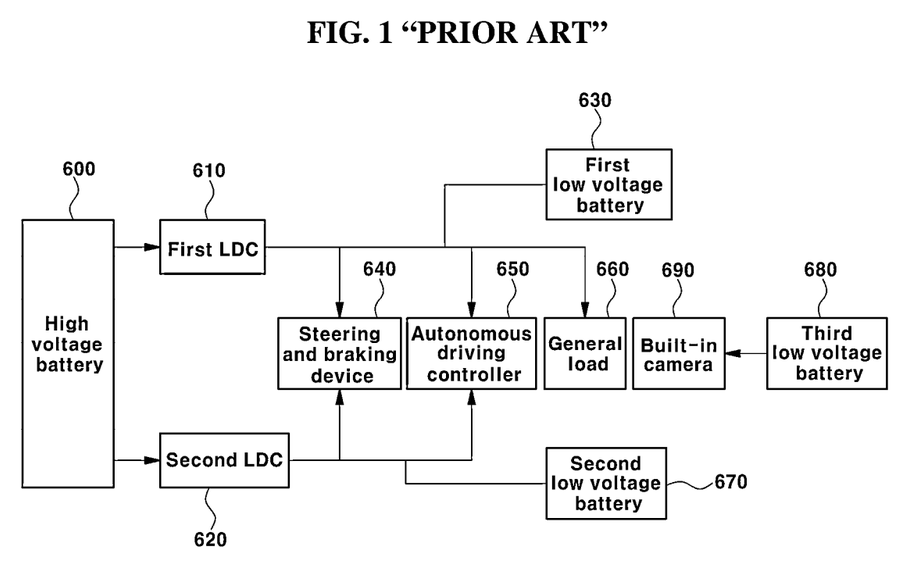
FIG. 1 illustrates an exemplary power supply system of an electric vehicle.

FIG. 1 illustrates an exemplary power supply system of a vehicle. An output voltage of a high voltage battery 600 is stepped down through low voltage power converters including a first low voltage DC-DC converter 610 (LDC) and a second LDC 620.

As a main power supply source, a first low voltage battery 630 is configured to supply power to electrical loads. The electrical loads include a steering and braking device 640, an autonomous driving controller 650, and a general load 660. The first low voltage battery 630 is constantly charged and discharged during driving and discharged when the vehicle is parked.

A second low voltage battery 670 is provided separately from the first low voltage battery 630 and executes a redundant power supply function. The second low voltage battery 670 is used only to supply redundant power during driving and cannot be used when the vehicle is parked, and, thus, surplus power is generated therein. In addition, a third low voltage battery 680 is included in the vehicle equipped with a built-in camera 690 and configured not to be used during driving, so surplus power is also generated in this case. The third low voltage battery 680 is used only for the built-in camera 690 when the vehicle is parked.

We have discovered that although a total capacity of low-voltage batteries in a vehicle is high (12 V is used in general) as described above, it is difficult to efficiently use 12 V energy because each battery is applied for respective separate domain. Furthermore, multiple low voltage batteries make it difficult to secure a packaging space, which increases weight and deteriorates in-line productivity.

SUMMARY

The present disclosure provides a power system for a vehicle which allows active power distribution and charging/discharging control in accordance with a vehicle state on the basis of total capacity of a low voltage battery included in the vehicle.

It should be appreciated by persons having ordinary skill in the art (hereinafter "ordinary skilled persons") that the object that could be achieved with the present disclosure is not limited to what has been particularly described hereinabove and the above and other objects that the present disclosure could achieve is more clearly understood from the following detailed description.

In accordance with the present disclosure, the above and other objects can be accomplished by the provision of a power system for a vehicle, including a high voltage battery, a low voltage DC-DC converter configured to step down a voltage of the high voltage battery and to output the stepped down voltage, a low voltage battery charged by output current of the low voltage DC-DC converter, the low voltage battery including a first cell group including a plurality of battery cells, a second cell group connected in parallel with the first cell group and including a plurality of battery cells, and a plurality of switches configured to electrically connect or disconnect the first cell group or the second cell group with the low voltage DC-DC converter, electrical loads configured to receive power from at least one of the low voltage DC-DC converter and the low voltage battery, and a controller configured to control opening or closing of the plurality of switches.

BRIEF DESCRIPTION OF THE DRAWINGS

The above and other features of the present disclosure will now be described in detail with reference to certain exemplary embodiments thereof illustrated in the accompanying drawings which are given hereinbelow by way of illustration only, and thus are not limitative of the present disclosure, and wherein.

DETAILED DESCRIPTION

Hereinafter, exemplary embodiments of the present disclosure are described in detail with reference to the accompanying drawings. Specific structures or functions described in the embodiments of the present disclosure are merely for illustrative purposes. Embodiments according to the concept of the present disclosure may be implemented in various forms, and it should be understood that they should not be construed as being limited to the embodiments described in the present specification, but include all of modifications, equivalents, or substitutes included in the spirit and scope of the present disclosure.

It should be understood that, although the terms "first," "second," etc. may be used herein to describe various elements, these elements should not be limited by these terms. These terms are only used to distinguish one element from another element. For instance, a first element discussed below could be termed a second element without departing from the teachings of the present disclosure. Similarly, the second element could also be termed the first element.

It should be understood that when an element is referred to as being "coupled" or "connected" to another element, it can be directly coupled or connected to the other element or intervening elements may be present therebetween. In contrast, it should be understood that when an element is referred to as being "directly coupled" or "directly connected" to another element, there are no intervening elements present. Other expressions that explain the relationship between elements, such as "between," "directly between," "adjacent to," or "directly adjacent to," should be construed in the same way.

Like reference numerals denote like components throughout the specification. In the meantime, the terminology used herein is for the purpose of describing particular embodiments only and is not intended to be limiting. As used herein, the singular forms "a," "an," and "the" are intended to include the plural forms as well, unless the context clearly indicates otherwise. It should be further understood that the terms "comprise," "include," "have," etc., when used in this specification, specify the presence of stated components, steps, operations, and/or elements, but do not preclude the presence or addition of one or more other components, steps, operations, and/or elements thereof.

Hereinafter, the present disclosure is described in detail with reference to the attached drawings.

Figure 2:
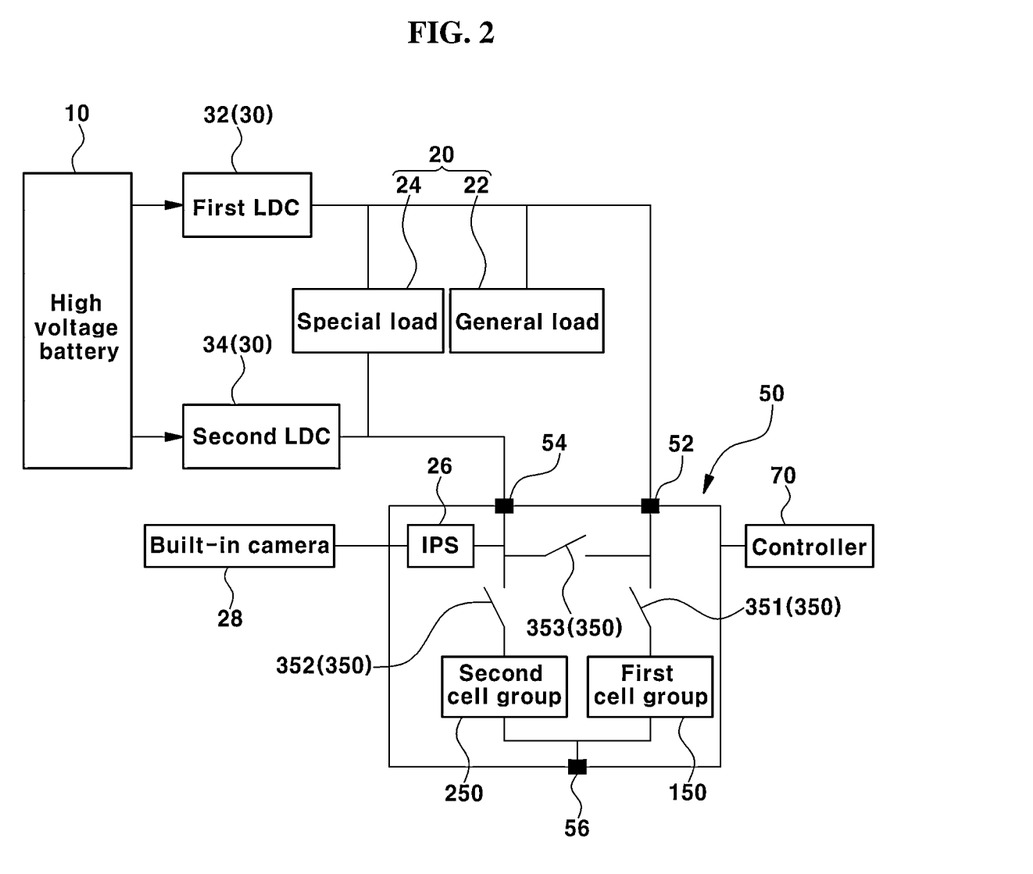
FIG. 2 illustrates a power system for a vehicle according to an embodiment of the present disclosure.

As illustrated in FIG. 2, a power system for a vehicle according to one form of the present disclosure includes: a high voltage battery 10, a low voltage DC-DC converter 30, a low voltage battery 50, and a controller 70.

The high voltage battery 10 is an energy storage device for supplying power to a drive motor that generates motive power of an electric vehicle or the like and is configured to be chargeable using an external power source. For example, the high voltage battery 10 may be charged through an on-board charger that converts AC power supplied from an external charging device into DC power that is chargeable to the high voltage battery 10 and provides the DC power.

The low voltage DC-DC converter 30 is configured to convert a high voltage of the high-voltage battery 10 into a low voltage applicable to the low voltage battery 50 or electrical loads 20. According to an embodiment of the present disclosure, the low voltage DC-DC converter 30 includes a first DC-DC converter (first LDC) 32 and a second low voltage DC-DC converter (second LDC) 34.

The low voltage DC-DC converter 30 is configured to step down the voltage of the high voltage battery 10 and to output the step-down voltage. The low voltage DC-DC converter 30 is configured to supply a power supply voltage (i.e., the step-down voltage) to the various electrical loads 20 included in the vehicle and to provide a charging voltage (i.e., the step-down voltage) to the low voltage battery 50.

According to an embodiment of the present disclosure, the electrical loads 20 include a general load 22 and a special load 24, which are both components consuming power for operation. In the present disclosure, the special load 24 refers to an electrical load having a redundant power source in addition to a primary power source in order to prevent a loss of power in any event. The special load 24 may include a steering device, a braking device, an autonomous driving controller, an advanced driver assistance system (ADAS), and the like. The general load 22 refers to an in-vehicle electrical load which does not have such a redundant power source. In other words, the general load 22 operates with a single power source. Accordingly, even though both the general load 22 and the special load 24 are electrical loads, separate terms are used for the general load 22 and the special load 24 in the specification to distinguish the general load 22 from the special load 24 that has a redundant power supply source.

According to an embodiment of the present disclosure, the electrical loads 20 further include a built-in camera 28. As an imaging device included in the vehicle, the built-in camera 28 images surroundings of the vehicle when the vehicle is parked or is traveling. The built-in camera 28 is connected to a power supply source and the low voltage battery 50 through an intelligent power switch (IPS) 26.

The low voltage battery 50 is charged by an output current of the low voltage DC-DC converter 30. The low voltage battery 50 may supply power to the electrical loads 20 and may be discharged due to the electrical loads 20.

According to one form of the present disclosure, the low voltage battery 50 may be a lithium ion battery. According to an embodiment of the present disclosure, the low voltage battery 50 includes a plurality of battery cells divided into two or more groups connected in parallel. As a non-limiting example, the low voltage battery 50 includes a first cell group 150, a second cell group 250, and a plurality of switches 350.

The first cell group 150 and the second cell group 250 respectively include a plurality of battery cells and are connected in parallel in the low voltage battery 50.

In another form, one end of the first cell group 150 is connected to a first terminal 52 of the low voltage battery 50. One end of the second cell group 250 is connected to a second terminal 54 of the low voltage battery 50. The other ends of the first cell group 150 and the second cell group 250 are connected to a third terminal 56 of the low voltage battery 50.

The first cell group 150 may be connected to the first low voltage DC-DC converter 32. Particularly, the first cell group 150 may be connected to the first low voltage DC-DC converter 32 through the first terminal 52 of the low voltage battery 50. The second cell group 250 may be connected to the second low voltage DC-DC converter 34. The second cell group 250 may be connected to the second low voltage DC-DC converter 34 through the second terminal 54 of the low voltage battery 50.

According to an embodiment of the present disclosure, the plurality of switches 350 may include three switches: a first switch 351, a second switch 352, and a third switch 353, each of which can be open or closed. The switches 350 enable or disable connection between the first low voltage DC-DC converter 32 and the first cell group 150, connection between the second low voltage DC-DC converter 34 and the second cell group 250, and connection between the first cell group 150 and the second cell group 250.

The first switch 351 is included in the low voltage battery 50 and is connected between an output terminal of the first low voltage DC-DC converter 32 and the first cell group 150. More specifically, the first switch 351 is disposed between the first terminal 52 and the first cell group 150 to be opened or closed.

The second switch 352 is provided between an output terminal of the second low voltage DC-DC converter 34 and the second cell group 250. More specifically, the second switch 352 is disposed between the second terminal 54 and the second cell group 250 and configured to be open or closed.

The third switch 353 is disposed between the first cell group 150 and the second cell group 250 and is configured to connect the first cell group 150 and the second cell group 250. More specifically, one end of the third switch 353 is connected between the first terminal 52 and the first switch 351 and the other end of the third switch 353 is connected between the second terminal 54 and the second switch 352.

The controller 70 is configured to control opening and closing of each switch 350 and to control operation of the IPS 26. Particularly, the controller 70 is configured to detect a vehicle state and to control opening and closing of each switch 350 to supply power in accordance with each vehicle state. For example, the controller 70 may detect a state of charge of the low voltage battery 50. The controller 70 may detect occurrence of abnormality, such as a short circuit in a power line between the first low voltage DC-DC converter 32 and the low voltage battery 50 or a power line between the second low voltage DC-DC converter 34 and the low voltage battery 50. Further, the controller 70 may receive vehicle state information representing whether the vehicle is traveling or is parked, and the like.

According to the present disclosure, power is supplied to the vehicle based on a vehicle state in various manners by including a plurality of cell groups connected in parallel and switches. Unlike a conventional lithium ion battery in which cells are configured in series, flexible power network separation can be achieved by connecting cells in parallel in the present disclosure.

Hereinafter, a method for controlling a power system for a vehicle according to various embodiments of the present disclosure is described. Table 1 summarizes control states of each component in each situation shown in FIG. 3 to FIG. 9, and dotted line arrows in FIG. 3 to FIG. 9 represent current flows in each situation. In the following, the first cell group 150 and the second cell group 250 may have different capacities. For example, the first cell group 150 may have a 40 Ampere-hour (Ah) capacity and the second cell group 250 may have a 20 Ah capacity.

Figure 3:
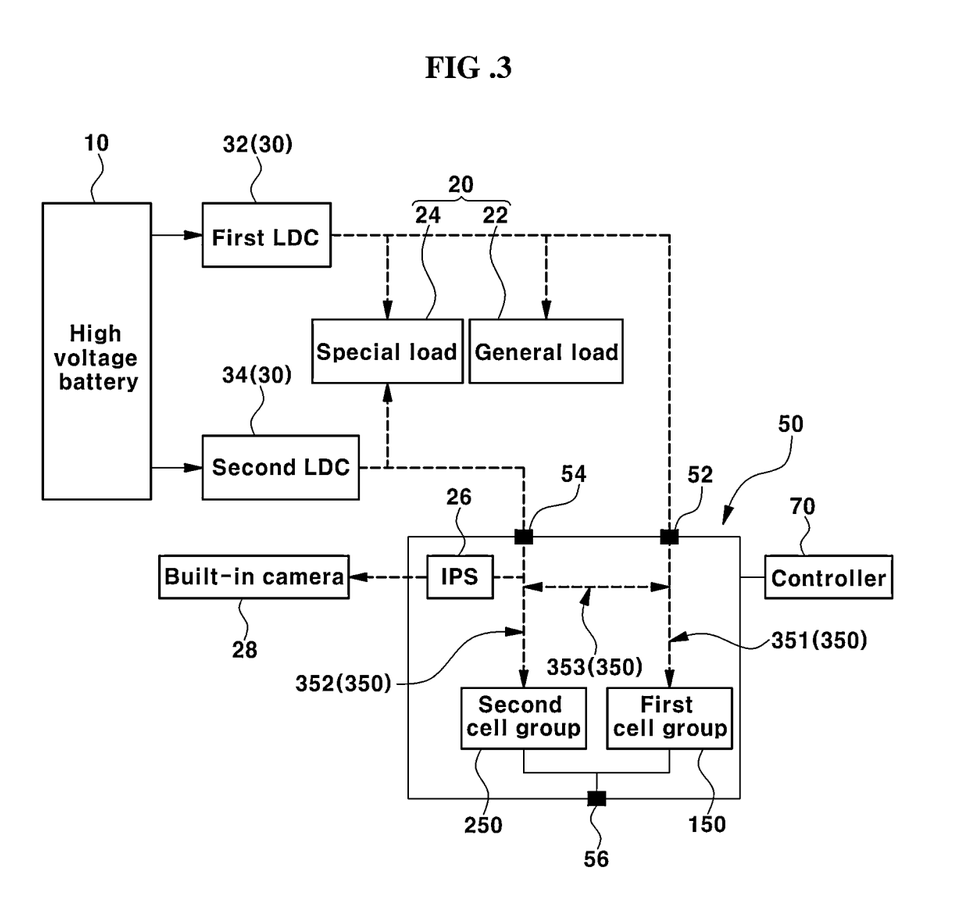
FIG. 3 illustrates a control state of the power system for a vehicle according to the present disclosure in a normal charging situation of a low voltage battery.

FIG. 3 illustrates a normal charging situation of the low voltage battery 50. In the normal charging situation of the low voltage battery 50, the controller 70 controls the first switch 351 and the second switch 352 to be closed and selectively controls the third switch 353 to be closed or open. As represented by dotted line arrows, the first low voltage DC-DC converter 32 supplies a power supply voltage to the general load 22 and the special load 24 and provides a charging voltage to the low voltage battery 50. The second low voltage DC-DC converter 34 supplies the power supply voltage to the special load 24 and provides the charging voltage to the low voltage battery 50. In this case, both the first switch 351 and the second switch 352 are closed, so charging of the first cell group 150 and the second cell group 250 is performed. Power is also supplied from the second low voltage DC-DC converter 34 to the built-in camera 28 by causing the IPS 26 to be closed. The third switch 353 may be closed or open. If the third switch 353 is closed as shown in the figure, current from the first low voltage DC-DC converter 32 may be supplied to the second cell group 250 through the third switch 353 and current from the second low voltage DC-DC converter 34 may be supplied to the first cell group 150 through the third switch 353.

Figure 4:
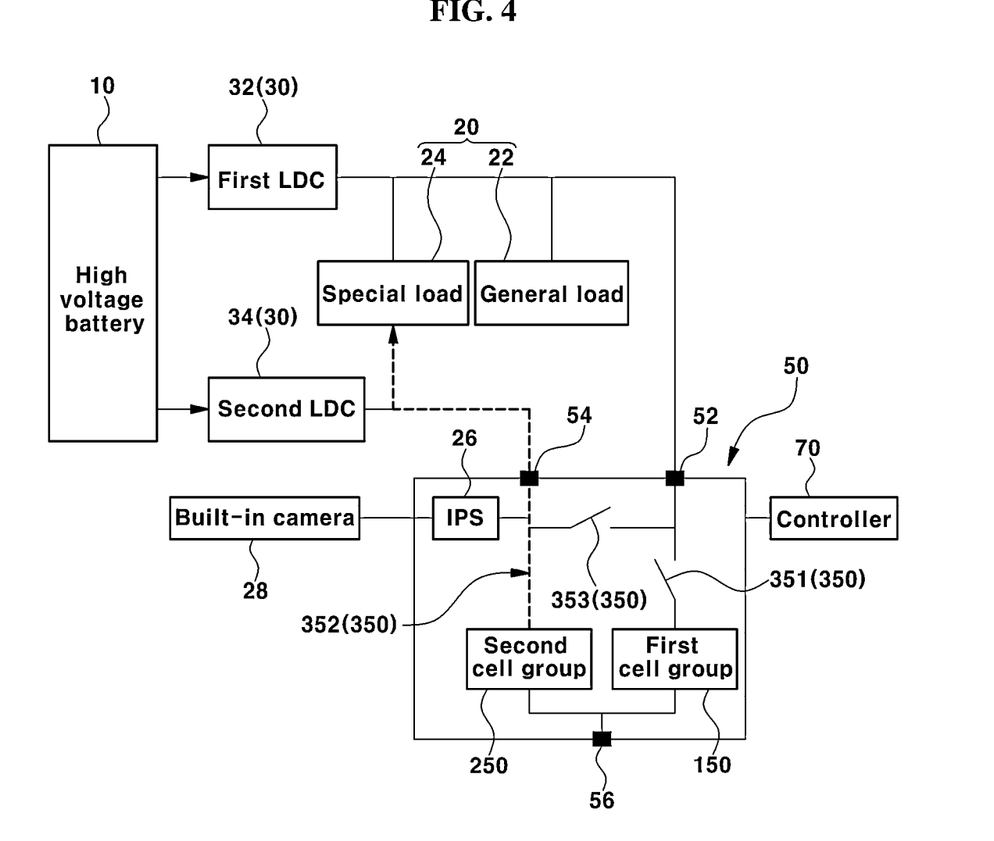
FIG. 4 illustrates a control state of the power system for a vehicle according to the present disclosure when a short circuit occurs in a first LDC power line.

FIG. 4 illustrates a control state when a short circuit occurs in a first LDC power line connecting the first low voltage DC-DC converter 32 and the low voltage battery 50. The controller 70 controls the second switch 352 to be closed and controls the first switch 351 and the third switch 353 to be open. In this case, the second cell group 250 is discharged while supplying power to the special load 24. When power is cut off due to a short circuit occurring in the first LDC power line, the controller 70 cuts off power of the first cell group 150 by opening the first switch 351. In this case, the second cell group 250 serves to provide redundant power. As illustrated in FIGS. 3 and 4, either one of the cell groups 150, 250 can act as a redundant power source for the special load 24 when a power line between the converter 32 and the battery 50 or a power line between the converter 34 and the battery 50 is short-circuited.

Figure 5:
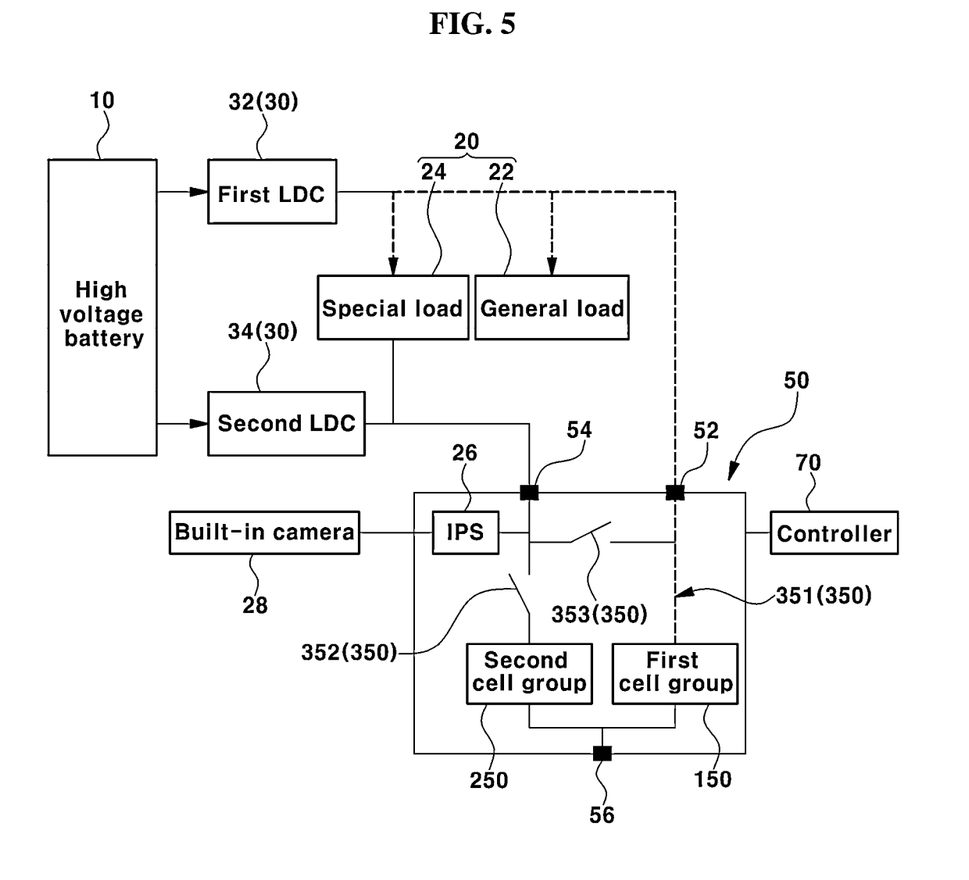
FIG. 5 illustrates a control state of the power system for a vehicle according to the present disclosure when a short circuit occurs in a second LDC power line.

FIG. 5 illustrates a control state when a short circuit occurs in a second LDC power line connecting the second low voltage DC-DC converter 34 and the low voltage battery 50. The controller 70 controls the first switch 351 to be closed and controls the second switch 352 and the third switch 353 to be open. The first cell group 250 is discharged while supplying power to the special load 24 and the general load 22. When the power is cut off due to a short circuit occurring in the second LDC power line, the controller 70 cuts off power of the second cell group 250 by opening the second switch 352. In this case, the first cell group 150 serves to provide redundant power.

As described above, the present disclosure allows power network separation and power redundancy in the special load 24.

Figure 6:
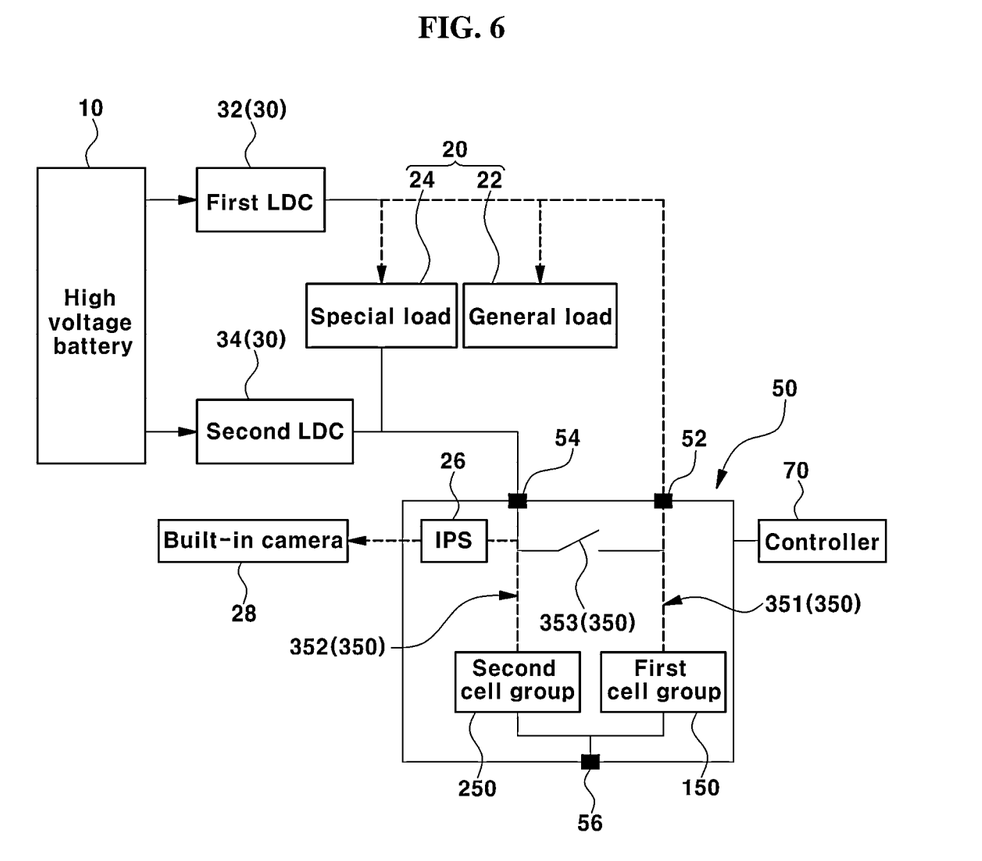
FIG. 6 illustrates a control state when power is normally supplied through a low voltage battery when a vehicle is parked.

FIG. 6 illustrates a current flow during normal power supply when a vehicle is parked (key off state). Here, states of charge of the first cell group 150 and the second cell group 250 correspond to a predetermined value, for example, 10% of a full charge or more. The controller 70 controls the first switch 351, the second switch 252, and the IPS 26 to be closed and controls the third switch 353 to be open. Accordingly, the first cell group 150 provides power to the general load 22 and the special load 24 and the second cell group 250 provides power to the built-in camera 28.

Figure 7:
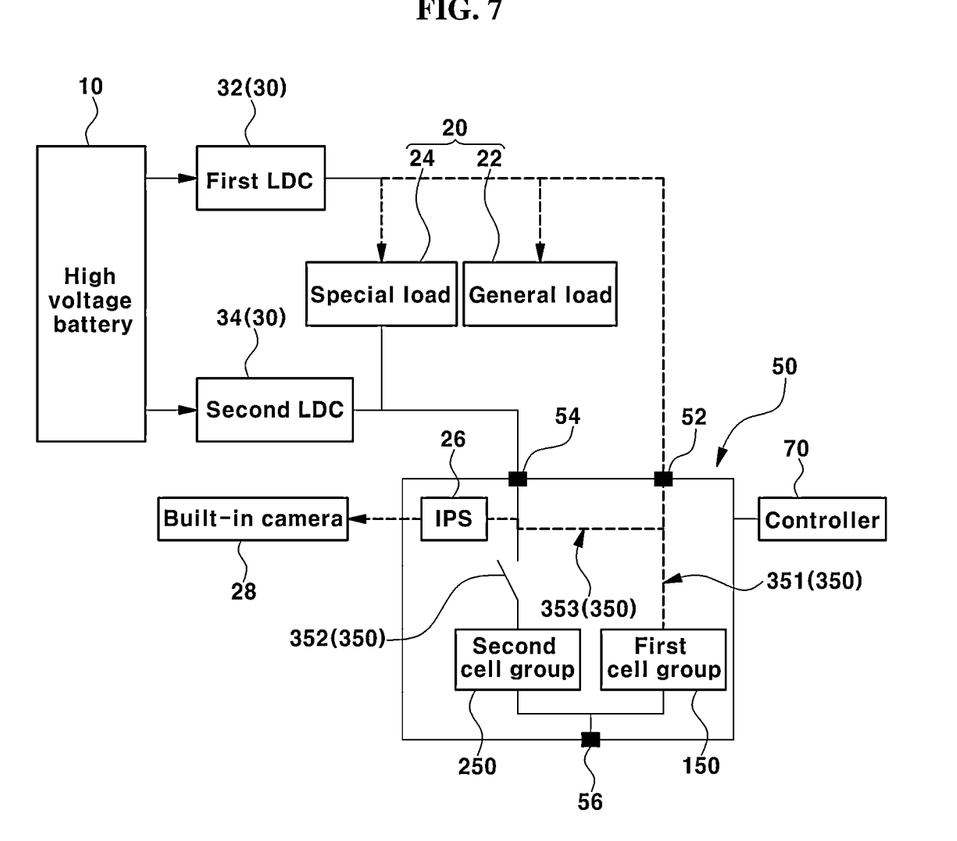
FIG. 7 illustrates a control state in another example of power supply when the vehicle is parked.

FIG. 7 illustrates another example where power is supplied when the vehicle is parked. A state of charge of the first cell group 150 is a predetermined value, for example, 10% of the full charge or more, and a state of charge of the second cell group 250 is less than 10%. The controller 70 controls the first switch 351 and the third switch 353 to be closed and controls the second switch 352 to be open. If the second cell group 250 is in a discharge state, the controller 70 controls the second switch 352 to be open such that the first cell group 150 supplies power to the electrical loads 20. Further, the controller 70 controls the IPS 26 to be closed such that power from the first cell group 150 is provided to the built-in camera 28 through the closed third switch 353.

Figure 8:
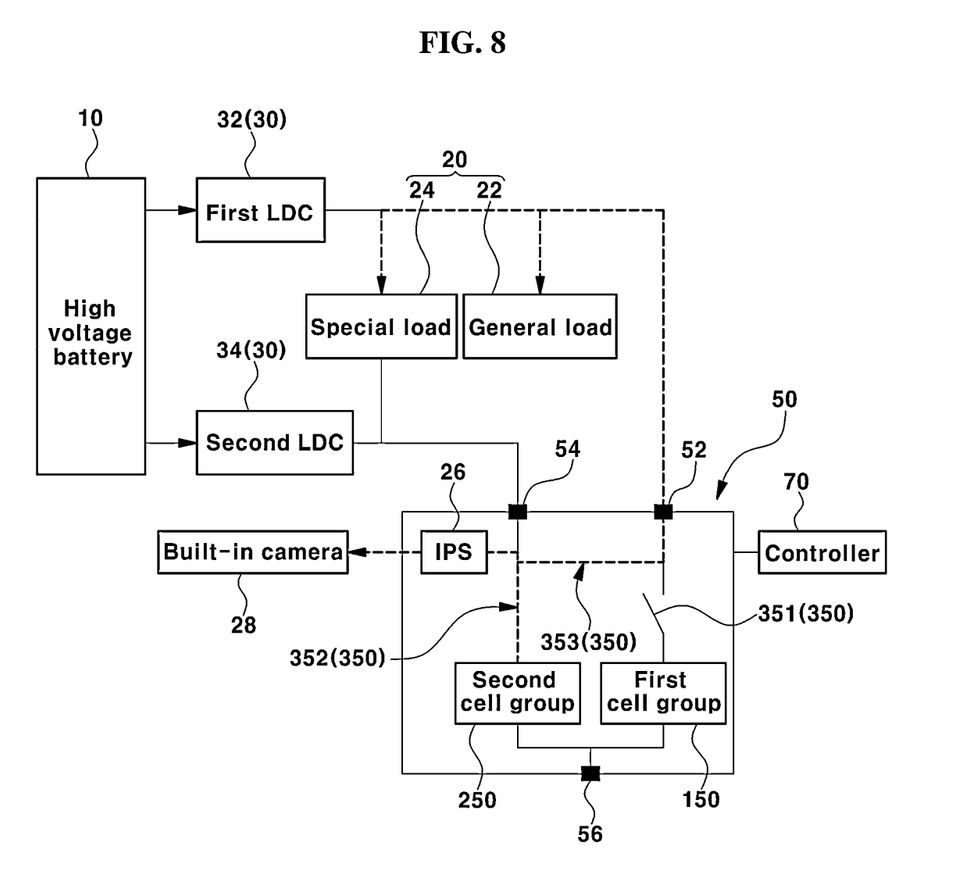
FIG. 8 illustrates a control state in further another example of power supply when the vehicle is parked.

FIG. 8 illustrates further another example where power is supplied when the vehicle is parked. In this case, a state of charge of the first cell group 150 is less than 10% and a state of charge of the second cell group 250 is 10% or more contrary to FIG. 7. The controller 70 controls the first switch 351 to be open and controls the second switch 352, the third switch 353, and the IPS 26 to be closed such that the second cell group 250 supplies power to the built-in camera 28 and the electrical loads 20.

Figure 9:
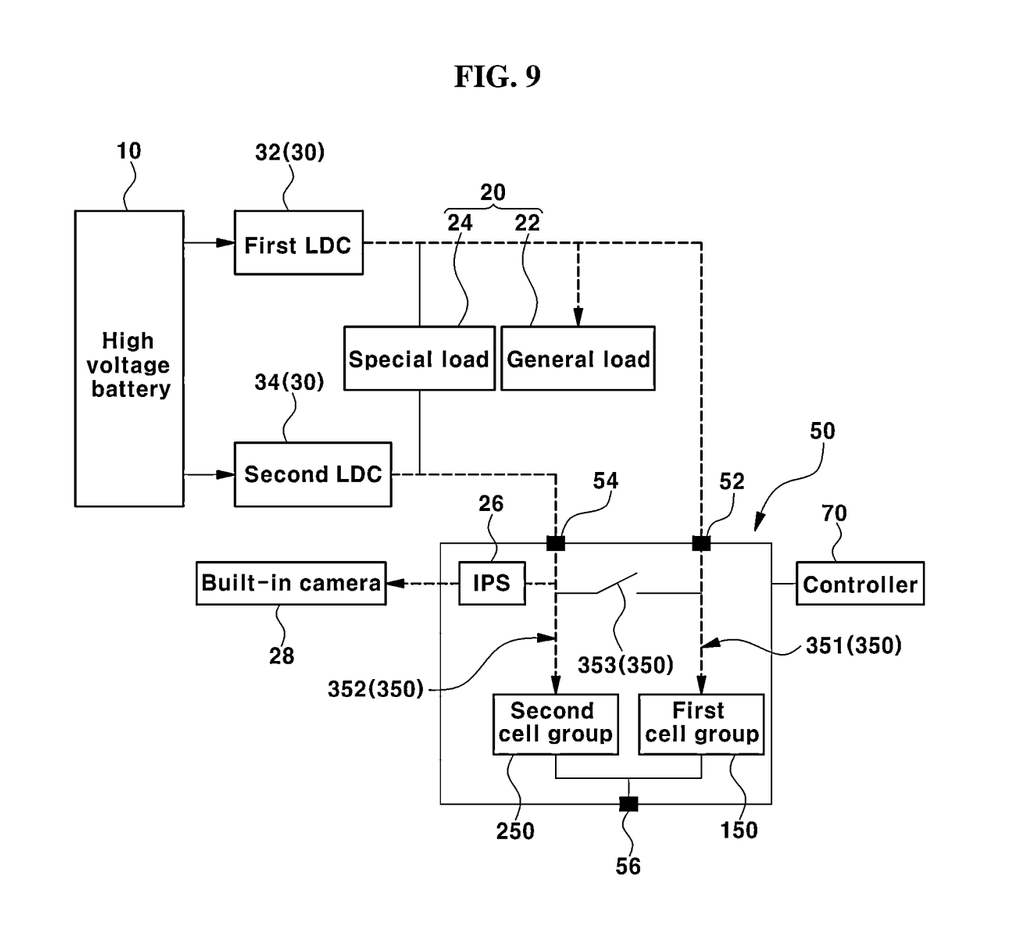
FIG. 9 illustrates a control state in a complementary charging situation of a low voltage battery.

FIG. 9 illustrates a complementary charging situation of the low voltage battery 50. Here, states of charge of the first cell group 150 and the second cell group 250 correspond to a predetermined value, for example, 30% or less. The controller 70 controls the third switch 353 to be open such that the first low voltage DC-DC converter 32 and the second low voltage DC-DC converter 34 complementally charge the first cell group 150 and the second cell group 250.

In this manner, the present disclosure can provide a power redundancy function during driving through power network separation control in a low voltage battery and provide power for loads when a vehicle is parked through power network connection control in the battery.

The present disclosure can reduce the capacity and weight of a low voltage battery and considerably improve assemblability and productivity.

TABLE 1

| | First switch 351 | Second switch 352 | Third switch 353 | IPS 26 | First cell group 150 | Second cell group 250 |
|---|---|---|---|---|---|---|
| Normal charging (FIG. 3) | ON | ON | ON or OFF | ON | Charging | Charging |
| First LDC power line failure (FIG. 4) | OFF | ON | OFF | OFF | — | Discharging |
| Second LDC power line failure (FIG. 5) | ON | OFF | OFF | OFF | Discharging | — |
| Power supply when vehicle is parked 1 (FIG. 6) | ON | ON | OFF | ON | Discharging | — |
| Power supply when vehicle is parked 2 (FIG. 7) | ON | OFF | ON | ON | — | Discharging |
| Power supply when vehicle is parked 3 (FIG. 8) | OFF | ON | ON | ON | — | Discharging |
| Complementary charging (FIG. 9) | ON | ON | OFF | ON | Charging | Charging |

The present disclosure described above is not limited to the above-described embodiments and the attached drawings and it should be appreciated by those having ordinary skill in the art that substitutions, modifications, and changes may be made in the embodiments without departing from the principles and spirit of the present disclosure.

According to the present disclosure, a power system for a vehicle provides active power distribution and charging/discharging control in accordance with a vehicle state.

It should be appreciated by persons having ordinary skill in the art that the effects of the present disclosure are not limited to what has been described above and other advantages should be more clearly understood from the present disclosure.

What is claimed is:

1. A power system for a vehicle, comprising:
   a high voltage battery;
   a low voltage DC-DC converter configured to step down a voltage of the high voltage battery and to output the stepped-down voltage, the low voltage DC-DC converter including a first low voltage DC-DC converter and a second low voltage DC-DC converter;
   a low voltage battery charged by an output current of the low voltage DC-DC converter, wherein the low voltage battery includes:
   a first cell group including a plurality of battery cells,
   a second cell group connected in parallel with the first cell group and including a plurality of battery cells, and
   a plurality of switches configured to electrically connect or disconnect the first cell group or the second cell group with the low voltage DC-DC converter,
   wherein the plurality of switches includes:
   a first switch connected between an output terminal of the first low voltage DC-DC converter and the first cell group;
   a second switch connected between an output terminal of the second low voltage converter and the second cell group; and
   a third switch comprising a first end connected between the first switch and the output terminal of the first low voltage DC-DC converter and a second end connected between the second switch and the output terminal of the second low voltage DC-DC converter;
   electrical loads configured to receive power from at least one of the low voltage DC-DC converter or the low voltage battery; and
   a controller configured to control opening or closing of the plurality of switches,
   wherein the third switch is connected to the first cell group and the second cell group such that the electrical loads receive power from at least one of the first cell group or the second cell group even when the third switch is opened.

2. The power system of claim 1, wherein the controller is configured to control opening or closing of the plurality of switches based on state information of the vehicle.

3. The power system of claim 1, wherein the electrical loads include:
   a general load electrically connected to a first power line between the first low voltage DC-DC converter and the low voltage battery; and a special load connected to a second power line between the second low voltage DC-DC converter and the low voltage battery.

4. The power system of claim 3, wherein the electrical loads further include:
   an intelligent power switch connected between the second end of the third switch and the output terminal of the second low voltage DC-DC converter, and
   a built-in camera configured to be provided with power according to opening/closing of the intelligent power switch.

5. The power system of claim 4, wherein the controller controls at least the first switch and the second switch among the first to third switches to be closed when the low voltage battery is charged while the vehicle is traveling.

6. The power system of claim 5, wherein the controller controls the intelligent power switch to be closed.

7. The power system of claim 4, wherein the controller controls the second switch to be closed and controls the first switch and the third switch to be open when a short circuit occurs in the first power line.

8. The power system of claim 7, wherein the controller controls the intelligent power switch to be open.

9. The power system of claim 4, wherein the controller controls the first switch to be closed and controls the second switch and the third switch to be open when a short circuit occurs in the second power line.

10. The power system of claim 4, wherein the controller controls the first switch and the second switch to be closed and controls the third switch to be open when states of charge of the first cell group and the second cell group are equal to or greater than a predetermined value when the vehicle is parked.

11. The power system of claim 4, wherein the controller controls the second switch to be open and controls at least the first switch among the first to third switches to be closed when a state of charge of the first cell group is equal to or greater than a predetermined value and a state of charge of the second cell group is less than the predetermined value when the vehicle is parked.

12. The power system of claim 11, wherein the controller controls the intelligent power switch to be closed when the controller controls the third switch to be closed.

13. The power system of claim 4, wherein the controller controls the first switch to be open and controls the second switch and the third switch to be closed when a state of charge of the first cell group is less than a predetermined value and a state of charge of the second cell group is equal to or greater than the predetermined value when the vehicle is parked.

14. The power system of claim 4, wherein the controller controls the first switch and the second switch to be closed and controls the third switch to be open at a time of complementary charging of the low voltage battery.

* * * * *